US010599298B1

(12) United States Patent
Donnelley et al.

(10) Patent No.: US 10,599,298 B1
(45) Date of Patent: Mar. 24, 2020

(54) SYSTEMS AND METHODS FOR SOCIAL BOOK READING

(71) Applicant: Amazon Technologies, Inc., Seattle, WA (US)

(72) Inventors: Samuel Ytzhak Donnelley, Auburn, WA (US); Sarah Elizabeth Funk, Seattle, WA (US); Emily Jean Staskowski, Carnation, WA (US); Christy Elizabeth Caldwell, Seattle, WA (US); Adrienne Anastasia Lombardo, Seattle, WA (US); Gregory William Long, Kirkland, WA (US); Lan Wang, Seattle, WA (US); Julie Lynne Teodorescu-Badia, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 166 days.

(21) Appl. No.: 15/661,537

(22) Filed: Jul. 27, 2017

Related U.S. Application Data

(63) Continuation of application No. 14/742,333, filed on Jun. 17, 2015, now Pat. No. 9,760,254.

(51) Int. Cl.
G06F 3/0483 (2013.01)
G09B 17/00 (2006.01)
H04L 12/18 (2006.01)

(52) U.S. Cl.
CPC ......... G06F 3/0483 (2013.01); G09B 17/003 (2013.01); H04L 12/1822 (2013.01)

(58) Field of Classification Search
CPC .................. G06F 3/0483; H04L 12/1822
USPC ........................................... 715/753
See application file for complete search history.

(56) References Cited

U.S. PATENT DOCUMENTS

| | | | | |
|---|---|---|---|---|
| 8,745,191 | B2 * | 6/2014 | Raleigh | G06Q 30/016 455/414.1 |
| 9,104,670 | B2 * | 8/2015 | Wadycki | G06F 16/24578 |
| 9,160,605 | B1 * | 10/2015 | Ducrou | H04L 63/104 |
| 9,268,734 | B1 * | 2/2016 | Ward | G06F 15/0291 |
| 9,424,107 | B1 * | 8/2016 | Ward | G06F 9/542 |
| 9,760,254 | B1 * | 9/2017 | Donnelley | H04L 12/1822 |
| 10,466,951 | B2 * | 11/2019 | Sirpal | G06F 1/1601 |
| 2010/0149306 | A1 * | 6/2010 | Gopal | H04L 12/1822 348/14.09 |

(Continued)

Primary Examiner — William D Titcomb
(74) Attorney, Agent, or Firm — Eversheds Sutherland (US) LLP

(57) ABSTRACT

Provided are systems and methods for progressively providing content of an electronic book (e-book) to members of a book reading group. An example method includes: determining a reading group associated with content, the reading group comprising a first user profile associated with a first user device, a second user profile associated with a second user device, an indication that the first user profile is designated as a group administrator; determining a first stop-position indicative of a first position in the content; determining a second stop-position indicative of a second position in the content; and sending, to the first user device and the second user device, a message comprising at least the first stop-position, and instructions to enable access to a first section, wherein the first section comprises a portion of the content preceding the first stop-position.

17 Claims, 7 Drawing Sheets

(56) References Cited

U.S. PATENT DOCUMENTS

| | | | |
|---|---|---|---|
| 2010/0306122 A1* | 12/2010 | Shaffer | G06Q 50/01 705/319 |
| 2012/0089668 A1* | 4/2012 | Berg | H04J 3/0667 709/203 |
| 2013/0100139 A1* | 4/2013 | Schliesser | G09B 5/02 345/467 |
| 2013/0151300 A1* | 6/2013 | Le Chevalier | G06Q 50/20 705/7.15 |
| 2013/0174016 A1* | 7/2013 | Glazer | G06F 16/9574 715/234 |
| 2013/0179521 A1* | 7/2013 | Hu | H04L 51/04 709/206 |
| 2013/0268826 A1* | 10/2013 | Nowakowski | G06F 17/2288 715/203 |
| 2014/0173020 A1* | 6/2014 | Reilly | H04L 67/32 709/217 |
| 2015/0006258 A1* | 1/2015 | Salama | G06Q 30/0206 705/7.35 |
| 2015/0128162 A1* | 5/2015 | Ionescu | H04N 21/6125 725/14 |
| 2015/0180674 A1* | 6/2015 | Shapiro | G06Q 10/10 715/753 |
| 2015/0339034 A1* | 11/2015 | Garcia | G06F 17/241 715/738 |
| 2016/0149864 A1* | 5/2016 | Flawn | G06F 16/93 726/22 |
| 2016/0164814 A1* | 6/2016 | Landau | H04L 51/16 715/753 |
| 2016/0232368 A1* | 8/2016 | Clark | G06F 16/367 |
| 2016/0357253 A1* | 12/2016 | Abraham | G06F 3/013 |

\* cited by examiner

SYSTEMS AND METHODS FOR SOCIAL BOOK READING

CROSS-REFERENCE TO RELATED APPLICATION(S)

This application is a continuation of U.S. application Ser. No. 14/742,333, filed Jun. 17, 2015, entitled, "Systems and Methods for Social Book Reading," the content of which is incorporated herein in its entirety.

BACKGROUND

People often participate in "book clubs" to engage in a more social form of reading. Books clubs typically include several people that read and discuss books. In some instances, a book club may read and discuss certain sections of a book in series. For example, members of a book club may read the first three chapters of a book individually during a first week and discuss that section as a group at the end of the first week, then read the next three chapters of the book individually during the second week and discuss that section as a group at the end of the second week, and so forth. Unfortunately, book clubs can be "spoiled" by members that are eager to read ahead or individuals that lag behind. For example, if a member reads ahead in a book, he/she may unintentionally reveal interesting material to the other members of the group prematurely, before those members have had a chance to read the material. As a further example, if an individual lags behind the group, he/she may not be able to contribute substantively to the group's discussion, and in some instances can inhibit the group having a productive discussion about what they have read, e.g., by asking questions that are answered in the material he/she failed to read.

Figure 1:
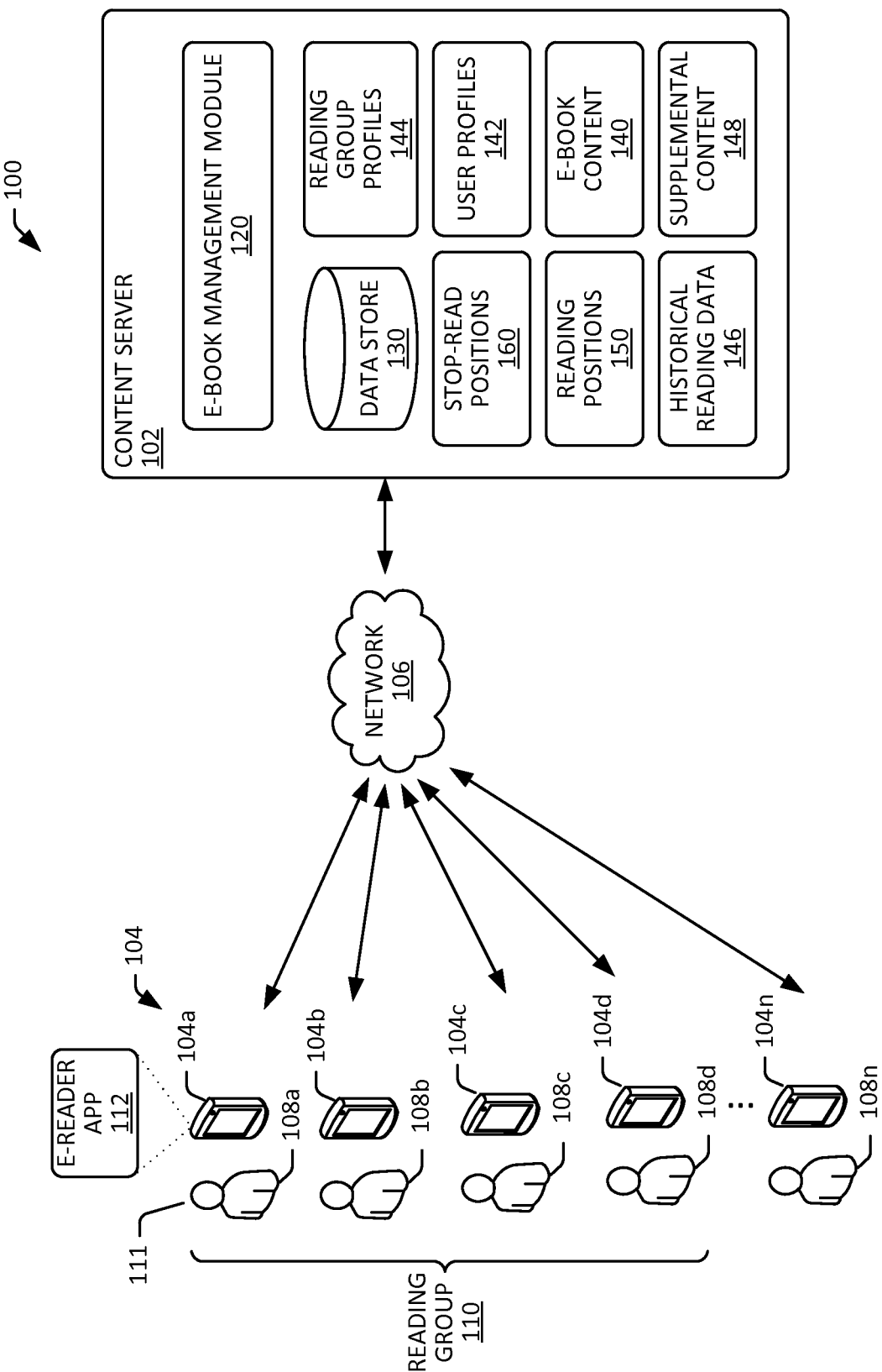
FIG. 1 is a diagram that illustrates an example content distribution environment in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed descriptions thereto are not intended to limit the disclosure to the particular form disclosed, but, to the contrary, the intention is to cover all modifications, equivalents, and alternatives falling within the spirit and scope of the present disclosure as defined by the appended claims.

DETAILED DESCRIPTION

Described herein are systems and methods for providing reading content to members of a reading group. In some embodiments, a reading group can identify a particular piece of reading content, such as an electronic book (e-book), select breakpoints (also referred to herein as "stop-read positions") in the content, and the reading content can be provided to the group's members progressively. In some embodiments, the group members are inhibited from reading past the current breakpoint and, thus, are only allowed to read the portion of the reading content before a current breakpoint. When the members of the group complete reading some or all of the portion of the reading content before the current breakpoint, a next breakpoint in the book can be identified, and the reading group may be allowed to read the portion of the reading content before that next breakpoint. This cycle can be repeated to progressively release reading content that can be accessed and read by the members of the reading group. For example, a book reading group having four members may select to read the e-book "The Long Night," and the group may select or otherwise identify breakpoints at the end of chapters 3, 6, 9, and so forth of the e-book. The content of the e-book may be downloaded from a content server onto each of the four member's electronic reader (e-reader) devices, along with a first stop-read position corresponding to the first breakpoint at the end of chapter 3. With the content and the current stop-read position (corresponding to the end of chapter 3) loaded onto the member's e-reader devices, each of the member's e-reader devices may allow its respective member to read chapters 1-3 but may not provide the member with access to the remaining chapters (e.g., the e-reader device may inhibit the member from accessing chapters 4-20). As the members of the reading group read the first three chapters, the reading position for each of the members can be monitored. For example, each of the e-readers may send corresponding read positions indicative of the member's last page read to the content server. When it is determined that the members of the group have read all (or at least a threshold amount) of chapters 1-3, the content server may determine that the next breakpoint for the group is at the end of chapter 6, and may send an updated stop-read position corresponding to the end of chapter 6 to each of the four member's electronic reader (e-reader) devices. As a result of the stop-read position being updated to the end of chapter 6, each of the member's e-reader devices may allow the member to read chapters 1-6 but may not provide the member with access to the remaining chapters (e.g., the e-reader device may inhibit the member from accessing chapters 7-20). This cycle of monitoring the reading by the members of the reading group, updating the stop-read position, and enabling the members to read the material up to the current stop-read position can be repeated in a similar manner, thereby progressively releasing the content of the e-book for access by the members of the group. Such a progressive release can help to ensure that members do not read ahead in the material, thereby helping to prevent members from prematurely revealing events in the book that spoil the reading for the other members of the group and can encourage a productive discussion of the material leading up to the most recent breakpoint in the e-book.

In some embodiments, a reading group can be defined by two or more members. For example, a reading group can include four members (e.g., Jennifer, John, Marc, and Jane) that have elected to participate in reading of the e-book "The Long Night." In some embodiments, a reading group can include a reading group administrator. A reading group administrator may be a participating member of a reading group. Continuing with the above example, the reading group administrator may be one of the four members (e.g., Jennifer) participating in reading of the e-book "The Long Night." A reading group administrator may be tasked with overseeing the reading group and may have authority to make decisions regarding the group's function, such as selecting group members, adding and/or removing group members, selecting reading material, selecting breakpoints for the reading group, deciding whether members are allowed to read ahead, and/or the like. In some embodiments, a reading group can select reading content to be read by the reading group. Continuing with the above example, the reading group administrator (e.g., Jennifer) may select the e-book "The Long Night" to be associated with the reading group.

In some embodiments, a reading group can include members that share one or more interest. For example, a reading group for the e-book "The Long Night" can be formed to include one or more persons that express an interest in reading the e-book. In some embodiments, a person's interest in reading material can be determined based on the person purchasing the reading material. For example, if Jennifer purchases the e-book "The Long Night" for viewing on her e-reader device, she may be presented with an option to join a reading group that includes other persons that purchased the e-book. In some embodiments, a person's interest in reading material can be determined based on the person's reading history. For example, if John has already read several e-books having the same author as the e-book "The Long Night", he may be presented with a suggestion to purchase and read the e-book "The Long Night", along with an option to join a reading group that includes other persons that purchased the e-book "The Long Night". If a user submits a request to join the suggested reading group, a current stop-read position for the group may be sent to the user's e-reader device. In response to receiving the current stop-read position for the group, the e-reader device may enable display reading material preceding the stop-read position and/or inhibit the display of the reading material following the stop-read position, as described herein.

In some embodiments, reading group members can request to be removed from (or "opt-out") of a reading group. For example, if a member joins a reading group but later decides that he/she is no longer interested in remaining a part of the group, the member may request to be removed from the group. After being removed, the now former member may be able to access content that he/she was not able to access as a member of the group. Continuing with the above example, if the reading group is currently associated with a breakpoint and a stop-read position at the end of chapter 3, and the member John requests to opt-out of the reading group, the content server may send an indication to John's e-reader that he is no longer in the group (e.g., removing the stop-read position). As a result, John's e-reader device may allow him to access to the entirety of the e-book "The Long Night" (e.g., including chapters 1-20).

In some embodiments, non-members of a reading group can be inhibited from contributing commentary that is accessible by the reading group. Continuing with the above example, after John opts out of the reading group, the content server may prevent any commentary provided by John from being distributed to members of the reading group. This can, for example, prevent John from reading ahead and providing commentary that could spoil the e-book for the remaining members of the group.

In some embodiments, members of a reading group may only be provided access to supplemental content (e.g., commentary for the e-book, other formats of the e-book, and/or the like) associated with the material leading up to the current breakpoint (or stop-read position) for the group, and/or can be inhibited from accessing supplemental content associated with the material beyond the current breakpoint (or stop-read position) for the reading group. For example, if the reading group has a current breakpoint (or stop-read position) at the end of chapter 3 of the e-book "The Long Night," then the content server may allow members of the reading group to access only commentary (e.g., reviews, comments, summaries, etc.) for chapters 1-3 of the e-book on their e-readers (and/or other devices), whether it is provided by non-members or members of the group and may inhibit the members from accessing commentary for chapters 4-20 of the e-book on their e-readers (and/or other devices). Continuing with the above example, if the reading group has a current breakpoint (or stop-read position) at the end of chapter 3 of the e-book "The Long Night," and the e-book has a corresponding movie and audio-book, then the content server may allow members of the reading group to access (e.g., to watch or listen to) only portions of the movie and/or the audio-book that correspond to chapters 1-3 of the e-book and may inhibit the members from accessing (e.g., watching or listening to) the portions of the movie and/or the audio-book that correspond to chapters 4-20 of the e-book.

In some embodiments, each of the e-reader devices for members of the group provides a content server with an indication of the member's current read position, thereby allowing the content server to track the reading progress of each of the members. Continuing with the above example, if John engages in a reading session one afternoon in which he reads to page 60 (e.g., in the middle of chapter 2), then John's e-reader may determine that John's last page read was page 60 and may send an indication of page 60 of the e-book "The Long Night" to the content server. If the end of chapter 3 is at page 100, and the breakpoint is at the end of chapter 3 (e.g., the stop-read position 160 is page 100), then the content server can determine that John has completed about 60% of the current reading section for the group. The content server may update a user profile for John (and/or a profile for the reading group) to include a last page read of page 60 of the e-book "The Long Night" for John and/or a reading completion of 60% for chapters 1-3 of the e-book "The Long Night" for John. Similarly, if John engages in a second reading session the next afternoon in which he reads to page 100, then John's e-reader may determine that John's last page read was page 100 and may send an indication of page 100 of the e-book "The Long Night" to the content server. The content server can determine that John has completed all (e.g., 100%) of the current reading section for the group. The content server may update the user profile for John (and/or a profile for the reading group) to include a last page read of page 100 of the e-book "The Long Night" for John and/or a reading completion of 100% for chapters 1-3 of the e-book "The Long Night" for John. A similar process can be undertaken for each of the members of the reading group such that the content server can track each the reading progress of each member of the group.

In some embodiments, a breakpoint (or stop-read position) for a reading group can be updated or otherwise modified in response to a triggering event. This can include, for example, the reading group completing a threshold amount of reading, the passage of a scheduled time for releasing a next section of content, and/or the like. In some embodiments, a breakpoint (or stop-read position) for a reading group can be updated or otherwise modified in response to some or all of the members of the group reading at least a threshold amount of the current reading section for the group. Continuing with the above example, if the reading group has identified breakpoints at the end of chapters 3, 6, 9, and so forth in the e-book "The Long Night," and the current breakpoint (or stop-read position) is the end of chapter 3, the content server may update the current breakpoint (or stop-read position) to be the end of chapter 6 in response to determining that the group members (e.g., Jennifer, John, Marc, and Jane) have each read at least a threshold amount of chapters 1-3 and may send the updated breakpoint (or stop-read position) corresponding to the end of chapter 6 to each of the four member's e-reader devices. In some embodiments, the threshold amount can be all (e.g., 100%) of the current reading section. For example, the content server may update the current breakpoint (or stop-read position) to be the end of chapter 6 in response to determining that the four members (e.g., Jennifer, John, Marc, and Jane) have each read all of chapters 1-3 (e.g., each of the members of the group has a last page read of 100). In some embodiments, the threshold amount can be less than all (e.g., 90%) of the current reading section. For example, the content server may update the current breakpoint (or stop-read position) to be the end of chapter 6 in response to determining that the four members (e.g., Jennifer, John, Marc, and Jane) have each read 90% of chapters 1-3 (e.g., each of the members of the group has a last page read of at least 90). In some embodiments, a breakpoint (or stop-read position) for a reading group can be updated or otherwise modified in response to a threshold number of the members of the group reading at least a threshold amount of the current reading section for the group. For example, the content server may update the current breakpoint (or stop-read position) to be the end of chapter 6 in response to determining that at least 75% of the four members have each read the threshold amount of chapters 1-3 (e.g., at least 3 of the 4 members of the group has a last page read that they have read the threshold amount of the current reading section).

In some embodiments, breakpoints (or stop-read positions) can be determined based on events related to the reading content. For example, if episodes of television series that correspond to the e-book "The Long Night" are being aired weekly, the content server may select a breakpoint (or stop-read position) that corresponds to the end of the last episode that has aired. For example, if the content server receives an indication that episode 2 has just aired, and the end of episode 2 corresponds to the end of chapter 6 of the e-book "The Long Night," then the content server may update the breakpoint (or stop-read position) for the reading group to be the end of chapter 6 of the e-book "The Long Night." An update of the breakpoint (or stop-read position) can include the content server sending the updated breakpoint (or stop-read position) to the e-reader devices of the members of the reading group.

In some embodiments, a breakpoint (or stop-read position) for a reading group can be updated or otherwise modified according to a schedule for the group. For example, if the group has identified breakpoints at the end of chapters 3, 6, 9, and so forth in the e-book "The Long Night," and corresponding release times of 12:00 a.m. on Jan. 1, 2015; 12:00 a.m. on Jan. 7, 2015, 12:00a.m. on Jan. 14, 2015, and so forth, then the content server may update the current breakpoint (or stop-read position) for the group to be the end of chapter 3 at about 12:00 a.m. on Jan. 1, 2015, update the current breakpoint (or stop-read position) for the group to be the end of chapter 6 at about 12:00 a.m. on Jan. 7, 2015, update the current breakpoint (or stop-read position) for the group to be the end of chapter 9 at about 12:00 a.m. on Jan. 14, 2015, and so forth.

In some embodiments, a breakpoint (or stop-read position) for a reading group can be updated or otherwise modified based on a selection of the group's administrator. Continuing with the above example, Jennifer (the administrator for the reading group) may access an administration page including graphical user interface (GUI) that provides for selection of the current breakpoint for the group, and may select to change the breakpoint for the group from the end of chapter 3 of the e-book "The Long Night," to the end of chapter 6 of the e-book "The Long Night." In response to this change, the content server may update the current breakpoint (or stop-read position) for the group to be the end of chapter 6. Such a selection may be made, for example, after the reading group has conducted a meeting to discuss the current reading section (e.g., the reading material preceding the current breakpoint for the group).

In some embodiments, breakpoints can be automatically selected. For example, the e-book "The Long Night" may be associated with a predefined set of breakpoints (or stop-read positions) at the end of chapters 3, 6, 9, and so forth. In some embodiments, predefined breakpoints (or stop-read positions) may be determined based on a variety of factors. For example, breakpoints (or stop-read positions) for an e-book can be predetermined based on suggestions by an author and/or publisher of the e-book, the end of sections (e.g., chapters) in the e-book, the length of sections (e.g., a breakpoints (or stop-read positions) every 50 pages), semantic analysis of the e-book which identifies natural breakpoints (or stop-read positions), and/or the like.

In some embodiments, breakpoints (or stop-read positions) can be determined based on crowdsourcing. Continuing with the above example, the content server may monitor where other individuals or reading groups have defined breakpoints in the e-book "The Long Night" and determine a predefined set of breakpoints (or stop-read positions) for the reading group that corresponds to a common set of breakpoints defined by at least a threshold amount (e.g., 50%) of the other individuals or reading groups.

In some embodiments, breakpoints (or stop-read positions) can be determined based on breakpoints for content related to the reading content. For example, if the content server receives an indication of a television series "The Long Night" that is related to the e-book "The Long Night" and includes a first episode, a second episode, a third episode and so forth that corresponds to chapters 1-3, 4-6, 7-9 and so forth, respectively, of the e-book "The Long Night," the content server may select breakpoints (or stop-read positions) at the end of chapters 3, 6, 9 and so forth of the e-book "The Long Night" for the reading group.

In some embodiments, breakpoints can be manually selected. Continuing with the above example, Jennifer (the administrator for the reading group) may access a reading group administration page including GUI that provides for selection of the breakpoints for the group, and may select the end of chapters 3, 6, 9, and so forth of the e-book "The Long Night" as the breakpoints (or stop-read positions) for the reading group. In some embodiments, the breakpoints can be changed. Continuing with the above example, if the breakpoints (or stop-read positions) for the reading group are suggested to be or are currently defined as the end of chapters 3, 6, 9, and so forth of the e-book "The Long Night" (e.g., based on automatic and/or manual selection), Jennifer (the administrator for the reading group) may access an administration page including a GUI that provides for selection of the breakpoint(s) for the group and may select to change the second breakpoint for the group from the end of chapter 6 to the end of chapter 7.

In some embodiments, upon a member of a reading group reaching a breakpoint (or stop-read position) a breakpoint page (also referred to as an "end-action" page) may be displayed. Continuing with the above example, if the current breakpoint for the reading group is page 100 (e.g., the end of chapter 3) of the e-book "The Long Night," then in response to determining that John has read to page 100 (e.g., by detecting John's selection to move to page 101), John's e-reader may display a breakpoint page for the end of chapter 3. In some embodiments, a breakpoint page can include a variety of information and/or interactive elements as described herein.

In some embodiments, a breakpoint page can include an indication of the time until the next section will be unlocked. Continuing with the above example, if the breakpoint (or stop-read position) for the reading group is to be updated to the end of chapter 6 at 12:00 a.m. on Jan. 7, 2015 based on a scheduled update of breakpoints, then a breakpoint page may display a countdown to 12:00 a.m. on Jan. 7, 2015 (e.g., "Only 22 hours and 5 minutes until you can begin reading chapters 4-6"). In some embodiments, a breakpoint page can include an indication of the progress of other members of the group. Continuing with the above example, a breakpoint page may indicate the reading progress of each of the other three members of the reading group for the e-book "The Long Night" (e.g., "Percentage of chapters 1-3 read by other members: Jennifer=75%; Marc=10%; Jane=100%"). In some embodiments, the reading progress can include an estimated time for the members to complete reading the current section (an "ETC"). This can be based on, for example, the respective member's reading speed, reading patterns, and/or the like.

In some embodiments, a breakpoint page can suggest, include and/or provide access to supplemental content. Continuing with the above example, the breakpoint page at the end of chapter 3 of the e-book "The Long Night" may include a summary of chapters 1-3, commentary provided by other persons regarding chapters 1-3 (e.g., provided by member and/or non-members of the group), suggested content (e.g., companion books, articles, movies, television shows, and/or the like).

In some embodiments, a breakpoint page can include interactive links to supplemental content. Continuing with the above example, the breakpoint page at the end of chapter 3 of the e-book "The Long Night" may include a hyperlink to a page with a summary of chapters 1-3, to commentary provided by other persons regarding chapters 1-3 (e.g., provided by member and/or non-members of the group), to other formats of the section (e.g., video, such as scenes of a movie or television show, that corresponds to chapters 1-3), and/or the like. In some embodiments, the supplemental content can be customized based on the context of the display of the breakpoint page. For example, if the member has reached the breakpoint page and it is determined that the breakpoint will not be updated for a relatively long period (e.g., more than 2 days) such that the user will not be able to access the next reading section for a relatively long time, then the supplemental content can correspond to content that is relatively long in length (e.g., a link to the e-book "The Day After" which is related to the e-book "The Long Night"). In contrast, if the member has reached the breakpoint page and it is determined that the breakpoint will be updated in a relatively short period (e.g., in less than 2 days) such that the user will be able to access the next reading section in a relatively short time, then the supplemental content can correspond to content that is relatively short in length (e.g., a link to a short article about the e-book "The Day After").

In some embodiments, a breakpoint page can include an interactive element for rating the section. For example, the breakpoint page at the end of chapter 3 of the e-book "The Long Night" may include an interactive drop down box for selecting a rating of 1-5 for chapters 1-3. In some embodiments, a breakpoint page can include an indication of ratings by others. For example, the breakpoint page at the end of chapter 3 of the e-book "The Long Night" displayed to one of four members of the reading group may include the ratings submitted up to that point in time by the other three members of the group and/or other persons that have rated that section.

In some embodiments, a breakpoint page can include an interactive element for opting out of the reading group. For example, the breakpoint page at the end of chapter 3 of the e-book "The Long Night" may include an interactive button labeled "Leave Reading Group." Upon selection of the button, the member may be removed from the reading group and may be provided access to the entirety of the e-book "The Long Night" as described herein.

In some embodiments, a breakpoint page can include an interactive element for requesting to read ahead of the reading group. For example, the breakpoint page at the end of chapter 3 of the e-book "The Long Night" may include an interactive button labeled "Request to Read Ahead to Chapter 6." Upon selection of the button, the member may be provided access to chapters 1-6 of the e-book "The Long Night" as described herein. In some embodiments, the request to read ahead may need to be approved (e.g., by the group administrator) before the member is provided the requested access. For example, upon selection of the button, a corresponding read-ahead request may be forwarded by the content server to the group administrator. Upon the group administrator approving the request, the content server may send an updated stop-read position corresponding to the end of chapter 6 to the e-reader for the member. As a result, the e-reader may provide the member with access to chapters 1-6 of the e-book "The Long Night."

In some embodiments, a breakpoint page can include an interactive element for voting to drop one or more users from the reading group. For example, the breakpoint page at the end of chapter 3 of the e-book "The Long Night" may include four interactive buttons for voting each member out of the group. If, for example, a threshold amount of the group (e.g., more than 60% of the members) votes to remove a member from the group, the member may be removed from the reading group. This can, for example, enable a reading group to eliminate members that are not making an effort to read material in a timely manner and are causing the other members to have to wait an excessively long time to gain access to the next reading section.

Although certain embodiments are described in the context of a particular type of reading content (e.g., the e-book "The Long Night") for the purpose of illustration, the embodiments described herein can be employed in any suitable context. For example, embodiments can be employed with other content formats, such as audio content (e.g., audio books), social media streams, and/or the like. With regard to audio content, for example, group members may be inhibited from listening past a point in an audio version of an e-book (e.g., an "audio book") that corresponding to a current breakpoint and, thus, are only allowed to listen to the portion of the audio content before a current breakpoint. In the context of education, a reading group may include students in a class (and a teacher of the class), and the teacher may be an administrator for the reading group. In such an instance, the reading content may include, for example, an electronic version of a text book or other material assigned to the students for reading. In some embodiments, a predefined set of breakpoints (or stop-read positions) can correspond to the end of the chapters of the e-book and/or the teacher can select or modify the breakpoints (or stop-read positions). In some embodiments, a breakpoint page can include assignments, such as a link to an assignment, a quiz, a test and/or the like, for the material in the corresponding reading section (e.g., a breakpoint page at the end of chapter 3 displaying a link to a quiz for chapter 3).

Accordingly, some of the embodiments described herein can provide for progressively releasing reading content to members of a reading group. Such a progressive release of reading content can help to ensure that reading group members do not read ahead, thereby helping to prevent members of the group from spoiling the reading for other members of the group (e.g., by prematurely discussing events that occur later in the reading content) and encouraging a productive discussion of the reading material up to the most recent breakpoint in reading content.

FIG. 1 is a diagram that illustrates an example reading content distribution environment ("environment") 100 in accordance with one or more embodiments. The environment 100 may include a content server 102 and/or one or more client or user devices 104 (e.g., user devices 104a-104n) communicatively coupled via a communications network 106. As described herein, the user devices 104 may be used by (or otherwise associated with) one or more users 108 (e.g., users 108a-108n). Furthermore, two or more of the users 108 may be members of a reading group 110 having a group administrator 111.

The network 106 may include an element or system that facilitates communication between the entities of the environment 100. For example, the network 106 may include an electronic communications network, such as the Internet, a local area network (LAN), a wide area network (WAN), a wireless local area network (WLAN), a cellular communications network, and/or the like. In some embodiments, the network 106 can include a single network or a combination of networks.

A user device 104 may include any variety of electronic devices, such as one or more electronic computing devices. A user device 104 may include, for example, a desktop computer, and/or one or more mobile computing devices, such as an electronic reader (e-reader), a laptop computer, a tablet computer, a personal digital assistant (PDA), a smart phone, a wearable computer device (e.g., a smart watch), and/or the like. In some embodiments, a user device 104 can include a networked device capable of communicating information via the network 106. A user device 104 may be a client of the content server 102. In some embodiments, a user device 104 may include various input/output (I/O) interfaces, such as a display screen (e.g., for displaying graphical user interfaces (GUIs)), an audible output interface (e.g., a speaker), an audible input interface (e.g., a microphone), an image acquisition interface (e.g., a camera), a biometric interface (e.g., an eye or fingerprint scanner), a keyboard, a pointer/selection device (e.g., a mouse, a trackball, a touchpad, a touchscreen, a stylus or the like), a printer, and/or the like. In some embodiments, a user device 104 can include general computing components and/or embedded systems optimized with specific components for performing specific tasks. A user device 104 may include, for example, an e-reader application 112. An e-reader application 112 may be executed by the user device 104 to provide access to textual content, such as e-books and/or the like. An e-reader device may include an electronic device that can present text for reading by a user. For example, an e-reader device may refer to a user device 104 that executes an application (e.g., an e-reader application) that can display text of an e-book (or other reading material) on a display screen of the device for reading by a person. In some embodiments, the programs or applications of a user device 104 include modules having program instructions that are executable by a computer system to perform some or all of the functionality described herein with regard to the user device 104. In some embodiments, a user device 104 can include one or more computer systems similar to that of the computer system 1000 described below with regard to at least FIG. 7.

The content server 102 may include an electronic computing device having network connectivity and capable of providing one or more services to network clients, such as the user devices 104. These services may include receiving, processing, storing, and/or serving or otherwise providing data, such as e-book content and related information. In some embodiments, the content server 102 can include an e-book management module 120. As described herein, the e-book management module 120 may provide for managing the sending of e-book content and related information (e.g., stop-read positions 160) to user devices 104 and/or the like. Although certain embodiments are described with regard to a single server for the purpose of illustration, embodiments may include employing multiple servers, such as a plurality of distributed servers. In some embodiments, a content server 102 can include one or more computer systems similar to that of the computer system 1000 described below with regard to at least FIG. 7.

In some embodiments, the content server 102 can include or otherwise have access to a data store 130. The data store 130 may include a non-transitory computer-readable medium for storing data thereon. The data store 130 may store, for example, the e-book management module 120, e-book content 140, one or more user profiles 142, one or more reading group profiles 144, historical reading data 146, supplemental content 148, one or more reading positions 150, one or more stop-read positions 160, and/or the like. Although certain embodiments are described with regard to a single data store 130 for the purpose of illustration, embodiments may include employing multiple data stores 130, such as a plurality of distributed data stores 130.

The e-book content 140 can include, for example, the full or partial content for one or more e-books. For example, the e-book content 140 may include the full content for the e-book "The Long Night." In some embodiments, the e-book content 140 can be provided to a user device 104 (e.g., an e-reader user device 104), and an e-reader application 112 of the user device can process the e-book content 140 to render the content of the e-book (e.g., the text of the e-book) for viewing and reading by a user 108).

A user profile 142 can include information that is associated with a user 108. For example, a user profile for a user 108 may include a name, age, gender, reading preferences, and/or the like for the user 108. In some embodiments, a user profile 142 for a user 108 can include an indication of one or more reading positions 150 for the user 108. A reading position 150 may indicate a current position in reading material up to which the user 108 has read. For example, if a user 108 has read to page 60 of the e-book "The Long Night" and to page 25 in another e-book "Success," then a first reading position 150 for the user may be "60: The_Long_Night" and a second reading position 150 for the user may be "25: Success."

A reading group profile 144 can include information that is associated with a reading group 110. In some embodiments, a reading group profile 144 can include a definition of the members of the corresponding reading group 110. For example, a reading group profile 144 for a reading group 110 including four members (e.g., Jennifer, John, Marc and Jane) may include a group definition that identifies the four members (e.g., includes a link to the user profiles 142 for each of Jennifer, John, Marc and Jane). In some embodiments, a reading group profile 144 can identify a group administrator 111 for the corresponding reading group 110. For example, a reading group profile 144 for a reading group 110 including four members (e.g., Jennifer, John, Marc and Jane) may include a group definition that identifies Jennifer as the group administrator 111 for the reading group 110. In some embodiments, a reading group profile 144 can include an indication of the reading content associated with the group. For example, a reading group profile 144 for a reading group 110 including four members (e.g., Jennifer, John, Marc and Jane) may include a reading content definition that identifies the e-book "The Long Night." In some embodiments, a reading group profile 144 can include an indication of one or more stop-read positions 160 corresponding to one or more breakpoints for the reading content associated with the reading group 110. For example, a reading group profile 144 for a reading group 110 including four members (e.g., Jennifer, John, Marc and Jane) may include a stop-read position definition that includes a first stop-read position 160 of page 100 (e.g., the end of chapter 3) of the e-book "The Long Night," a second stop-read position 160 of page 180 (e.g., the end of chapter 6) of the e-book "The Long Night," a third stop-read position 160 of page 300 (e.g., the end of chapter 9) of the e-book "The Long Night," and/or the like. Although certain embodiments describe stop-read positions 160 corresponding to a page for the purpose of illustration, embodiments can include any suitable location, such as a page and line number.

In some embodiments, members of a reading group 110 can be associated with different stop-read positions 160. For example, if the reading group 110 is initially associated with a first stop-read position 160 of page 100 (e.g., the end of chapter 3) of the e-book "The Long Night," then all four members (e.g., Jennifer, John, Marc and Jane) may be associated with the first stop-read position 160 of page 100 (e.g., the end of chapter 3) of the e-book "The Long Night." If, however, John reads to page 100 of the e-book "The Long Night," he requests to read ahead to the next reading section, and the request is approved (e.g., by the group administrator 111), then the content server 102 may update the reading group profile 144 to associate John with the second stop-read position 160 of page 180 (e.g., the end of chapter 6) of the e-book "The Long Night," while the other members remain associated with the first stop-read position 160 of page 100 (e.g., the end of chapter 3) of the e-book "The Long Night." In such embodiments, the content server 102 may send an updated stop-read position 160 (e.g., the second stop-read position 160 of page 180 of the e-book "The Long Night") to John's e-reader (e.g., user device 104b).

In some embodiments, a reading group profile 144 can include an indication of reading progress of one or more of the members of the corresponding reading group 110. Continuing with the above example, the reading group profile 144 for the reading group 110 for the e-book "The Long Night" may include a current reading position 150 for each of the four members (e.g., Jennifer, John, Marc and Jane). In some embodiments, the reading progress may include an indication of each member's progress with regard to the current reading section. For example, if the content server 102 determines that the current stop-read position is page 100 (e.g., the end of chapter 3) of the e-book "The Long Night," and that the current read positions 150 for Jennifer, John, Marc and Jane are pages 75, 100, 10, and 100, respectively, then the content server 102 may determine reading progresses for the current reading section of 75%, 100%, 10%, and 100% for Jennifer, John, Marc and Jane, respectively. The content server 102 may update the corresponding reading group profile 144 to include their respective progresses.

Historical reading data 146 may include reading information gathered from one or more users 108. This can include reading data 146 acquired from users 108 that are members of the reading group 110 and/or users 108 that are not members of the reading group 110. In some embodiments, the historical reading data 146 can include information collected by the content server 102 from any number of users 108 and/or user devices 104 and/or for any variety of reading content, such as different e-books. That is, the reading data 146 may include data for any variety of reading content that is crowd-sourced from one or more users 108. The reading data 146 may include, for example, reading positions (e.g., last page read by users 108), breakpoints (e.g., stop-read positions 160 used by one or more reading groups 110), time to read for sections of reading content (e.g., reading speeds for users 108 when reading different sections of reading content), and/or the like.

Supplemental content 148 may include any variety of supplemental content 148 that can be provided for presentation to a user 108. For example, supplemental content 148 can include commentary, reviews, summaries, video content (e.g., movies, television shows, video clips, and/or the like), audio content (e.g., audio books, podcasts, and/or the like), documents (e.g., assignments, quizzes, tests, and/or the like), e-books (e.g., different versions or related e-books), and/or the like. In some embodiments, supplemental content 148 for a reading group 110 can include any content that can supplement the e-book associated with the reading group 110. For example, if the reading group 110 is associated with the e-book "The Long Night," then the supplemental content 148 for the reading group 110 can include any content (e.g., other than the e-book content 140 for the e-book "The Long Night"), such as commentary, reviews, summaries, video content (e.g., movies, television shows, video clips, and/or the like), audio content (e.g., audio books, podcasts, and/or the like), documents (e.g., assignments, quizzes, tests, and/or the like), e-books (e.g., different versions or related e-books), and/or the like related to the e-book "The Long Night."

Figure 2:
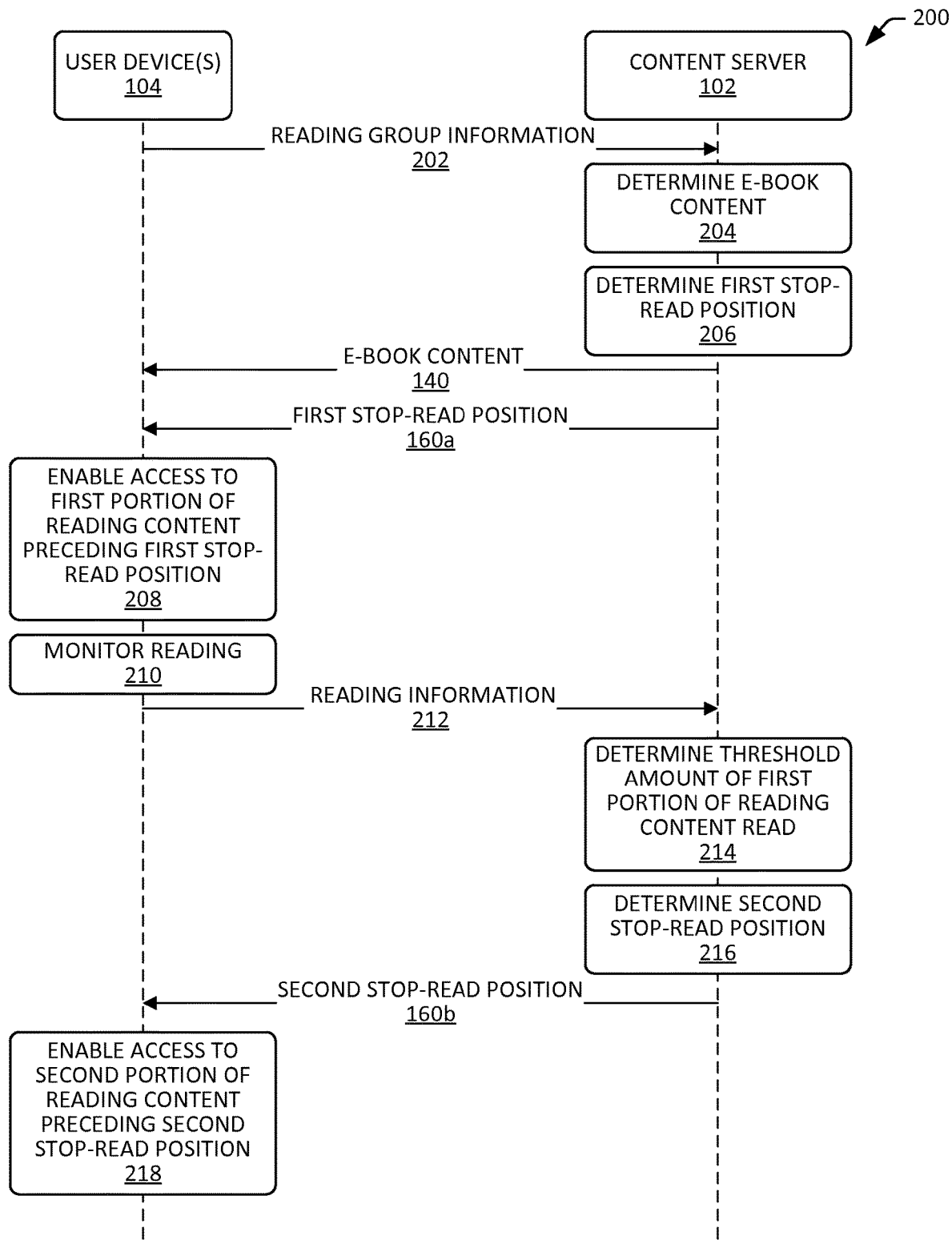
FIG. 2 is a process diagram that illustrates an example process for providing reading content to reading groups in accordance with one or more embodiments.

FIG. 2 is a process diagram that illustrates an example process 200 for providing reading content to a reading group 110 in accordance with one or more embodiments. The process 200 can include the content server 102 receiving reading group information 202 from one or more user devices 104. Continuing with the above example, this can include Jennifer (e.g., a first user 108a) submitting via her e-reader device (e.g., a first user device 104a) a definition for a reading group that specifies that the following: that she, John (e.g., user 108b), Marc (e.g., user 108c) and Jane (e.g., user 108d) are members of a reading group 110; that she is the group administrator 111 for the reading group 110; that the reading group 110 is to read the e-book "The Long Night"; and at least three breakpoints (or stop-read positions 160) at page 100 (e.g., the end of chapter 3 of the e-book "The Long Night"), at page 180 (e.g., the end of chapter 6 of the e-book "The Long Night"), and at page 300 (e.g., the end of chapter 9 of the e-book "The Long Night"). The content server 102 may modify (e.g., update) a reading group profile 144 to include or otherwise reflect some or all of the reading group information 202. In some embodiments, the reading group information can be received from any variety of sources, such as another server.

The process 200 can include the content server 102 determining e-book content (block 204). This can include, for example, the content server 102 identifying the e-book content 140 stored in data store 130 that corresponds to the e-book "The Long Night" associated with the reading group 110.

The process 200 can include the content server 102 determining at least a first stop-read position (block 206). This can include, for example, the content server 102 identifying the first stop-read position 160 specified in the reading group profile 144 for the reading group 110. For example, the content server 102 may determine a stop-read position 160 of page 100 of the e-book "The Long Night" (e.g., the end of chapter 3 of the e-book "The Long Night").

The process 200 can include the content server 102 sending the e-book content 140 and the determined first stop-read position 160 to some or all of the user devices 104 associated with the members of the reading group 110. For example, the content server 102 may send all of the e-book content 140 (e.g., pages 1-1000) of the e-book "The Long Night" and the first stop-read position 160a (e.g., "100: The_Long_Night") to each of the respective e-reader devices (e.g., user devices 104a, 104b, 104c and 104d) associated with Jennifer, John, Marc and Jane (e.g., users 108a, 108b, 108c and 108d). In some embodiments, the content server 102 may only send a portion of the e-book content 140, such as the portion of the reading content pertaining to the current reading section (e.g., the portion preceding the current stop-read position 160). For example, the content server 102 may send pages 1-100 of the e-book content 140 of the e-book "The Long Night" (e.g., corresponding to the current reading section preceding the current stop-read position 160) to each of the respective e-reader devices (e.g., user devices 104a, 104b, 104c and 104d) associated with Jennifer, John, Marc and Jane (e.g., users 108a, 108b, 108c and 108d). In such an embodiment, the content server 102 may send corresponding sections of the e-book content 140 along with updated stop-read positions 160 (e.g., send pages 101-180 of the e-book "The Long Night" along with a second stop-read position 160b indicating page 180 of the e-book "The Long Night," and so forth).

The process 200 can include one or more of the user devices 104 enabling access to the first portion of the reading content preceding the first stop-read position 160a (block 208). For example, each of the respective e-reader devices (e.g., user devices 104a, 104b, 104c and 104d) associated with Jennifer, John, Marc and Jane (e.g., users 108a, 108b, 108c and 108d) may allow the users to read the first reading section of the e-book "The Long Night," including pages 1-100 of the e-book "The Long Night." Further, each of the respective e-reader devices (e.g., user devices 104a, 104b, 104c and 104d) associated with Jennifer, John, Marc and Jane (e.g., users 108a, 108b, 108c and 108d) may inhibit them from reading past the first reading section of the e-book "The Long Night." For example, each of the respective e-reader devices (e.g., user devices 104a, 104b, 104c and 104d) may not allow Jennifer, John, Marc and Jane (e.g., users 108a, 108b, 108c and 108d) to access pages 101-1000 of the e-book "The Long Night."

The process 200 can include one or more of the user devices 104 monitoring the reading of the reading content (block 210). For example, each of the respective e-reader devices (e.g., user devices 104a, 104b, 104c and 104d) may monitor the pages read by Jennifer, John, Marc and Jane (e.g., users 108a, 108b, 108c and 108d), respectively. In some embodiments, this can include the e-reader tracking a current reading position 150 (e.g., last page read) for the corresponding user 108. In some embodiments, corresponding reading information 212 is sent by the one or more user device 104 to the content server 102. For example, if John engages in a reading session one afternoon in which he reads to page 60 (e.g., in the middle of chapter 2), then John's e-reader may determine that John's last page read was page 60 and may send an indication of page 60 of the e-book "The Long Night" to the content server 102. If the end of chapter 3 is at page 100, and the breakpoint is at the end of chapter 3 (e.g., the stop-read position 160 is page 100), then the content server 102 can determine that John has completed about 60% of the current reading section for the reading group 110. The content server 102 may update a user profile 142 for John and/or the reading group profile 144 to include a last page read of page 60 of the e-book "The Long Night" for John and/or a reading completion of 60% for chapters 1-3 of the e-book "The Long Night" for John. If John engages in a second reading session the next afternoon in which he reads to page 100, then John's e-reader may determine that John's last page read was page 100 and may send an indication of page 100 of the e-book "The Long Night" to the content server 102. The content server 102 can determine that John has completed all (e.g., 100%) of the current reading section for the reading group 110. The content server 102 may update a user profile 142 for John and/or the reading group profile 144 to include a last page read of page 100 of the e-book "The Long Night" for John and/or a reading completion of 100% for chapters 1-3 of the e-book "The Long Night" for John. A similar process can be completed for each of the members of the reading group 110 such that the content server 102 can track each member's reading progress. In some embodiments, the content server 102 may update the reading group profile 144 and/or the historical reading data 146 to include or otherwise reflect the received reading information 212.

The process 200 can include the content server 102 determining that at least a threshold amount of the first portion of the reading content has been read (block 214), determining a second ("updated") stop-read position 160b (block 216), and sending the second stop-read position 160b to some or all of the user devices 104 associated with the members of the reading group 110. In some embodiments, the threshold amount can be all (e.g., 100%) of the current reading section. For example, in response to determining that the four members have each read all of chapters 1-3 (e.g., each of the members of the reading group 110 has a user profile 142 indicating a last page read of 100 for the e-book "The Long Night"), the content server 102 may determine a second stop-read position 160b to be page 180 (e.g., the end of chapter 6 of the e-book "The Long Night"), and send the second stop-read position 160b (e.g., "180: The_Long_Night") to each of the respective e-reader devices (e.g., user devices 104a, 104b, 104c and 104d) associated with Jennifer, John, Marc and Jane (e.g., users 108a, 108b, 108c and 108d). In some embodiments, the threshold amount can be less than all (e.g., 90%) of the current reading section. For example, in response to determining that the four members have each read 90% of chapters 1-3 (e.g., each of the members of the reading group 110 has a user profile 142 indicating a last page read of at least 90 for the e-book "The Long Night"), the content server 102 may determine the second stop-read position 160*b* to be page 180 (e.g., the end of chapter 6 of the e-book "The Long Night") and send the second stop-read position 160*b* (e.g., "180: The_Long_Night") to each of the respective e-reader devices (e.g., user devices 104*a*, 104*b*, 104*c* and 104*d*) associated with Jennifer, John, Marc and Jane (e.g., users 108*a*, 108*b*, 108*c* and 108*d*).

Similar to the above description regarding block 208, the process 200 can include one or more of the user devices 104 enabling access to the second portion of the reading content preceding the second stop-read position 160*b* (block 218). For example, each of the respective e-reader devices (e.g., user devices 104*a*, 104*b*, 104*c* and 104*d*) associated with Jennifer, John, Marc and Jane (e.g., users 108*a*, 108*b*, 108*c* and 108*d*) may allow the users to read the first and second reading sections of the e-book "The Long Night," including pages 1-180 of the e-book "The Long Night." Furthermore, each of the respective e-reader devices (e.g., user devices 104*a*, 104*b*, 104*c* and 104*d*) associated with Jennifer, John, Marc and Jane (e.g., users 108*a*, 108*b*, 108*c* and 108*d*) may inhibit them from reading past the second reading section of the e-book "The Long Night." For example, each of the respective e-reader devices (e.g., user devices 104*a*, 104*b*, 104*c* and 104*d*) may not allow Jennifer, John, Marc and Jane (e.g., users 108*a*, 108*b*, 108*c* and 108*d*) to access pages 181-1000 of the e-book "The Long Night."

This iterative monitoring and release of reading content for reading by the members of the group may continue, for example, until the reading group 110 has completed reading of the content. For example, upon the content server 102 determining that at least a threshold amount of the second section of the reading content has been read, the content server 102 may send a third stop-read position 160 to the e-readers (e.g., user devices 104*a*, 104*b*, 104*c* and 104*d*) for Jennifer, John, Marc and Jane (e.g., users 108*a*, 108*b*, 108*c* and 108*d*), such that the e-readers allow the members of the reading group 110 to read pages 1-300 of the e-book "The Long Night," and so forth until Jennifer, John, Marc and Jane have access to the entire e-book "The Long Night."

Figure 3:
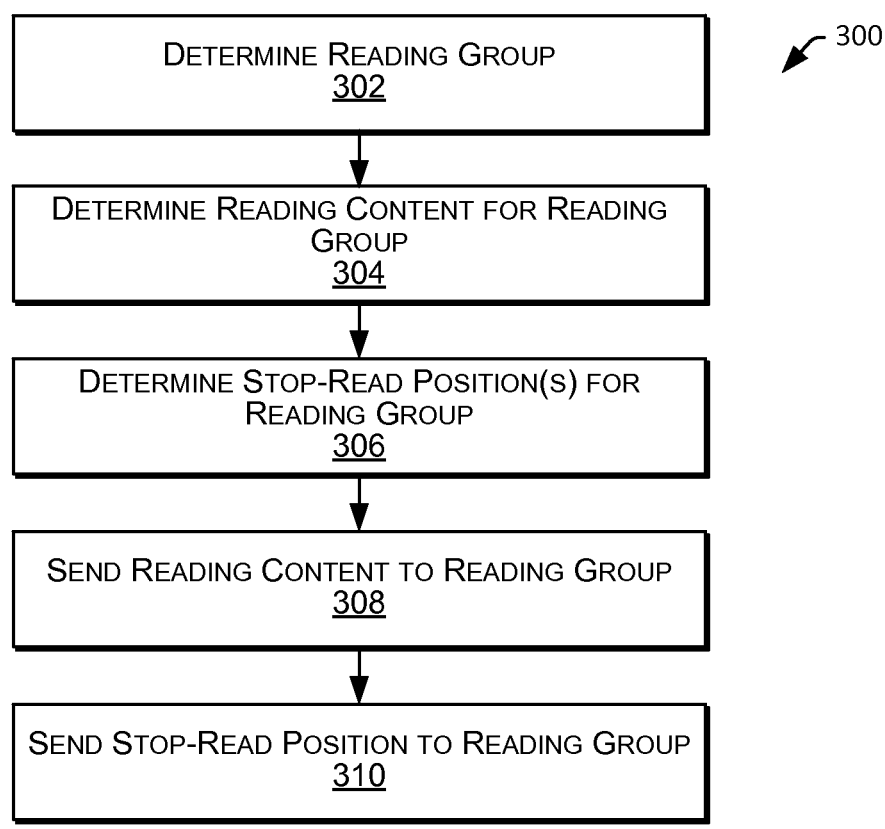
FIGS. 3 and 4 are flow diagrams that illustrate example methods for providing reading content to reading groups in accordance with one or more embodiments.
Figure 4:
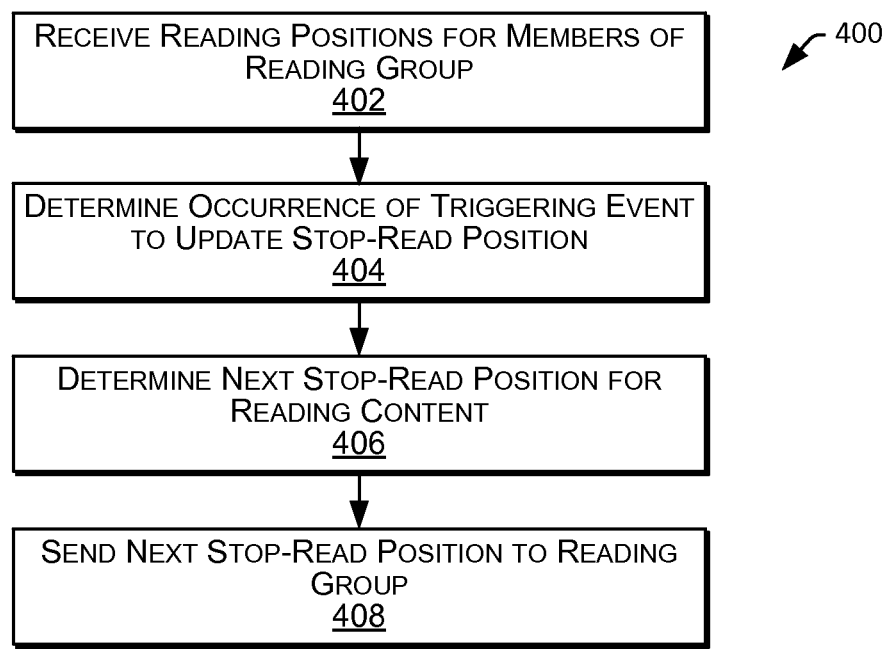

FIGS. 3 and 4 are flow diagrams that illustrate example methods for providing reading content to reading groups in accordance with one or more embodiments. FIG. 3 is a flow diagram that illustrates example method 300 for distributing reading content to reading groups in accordance with one or more embodiments. Method 300 may generally include determining a reading group (block 302), determining reading content for the reading group (block 304), determining one or more stop-read positions for the reading group (block 306), sending reading content to the reading group (block 308), and sending a stop-read position to the reading group (block 310). In some embodiments, some or all of the aspects of method 300 can be performed by the content server 102 (e.g., some or all of the aspects of method 300 can be performed by the e-book management module 120).

In some embodiments, determining a reading group (block 302) can include the content server 102 determining one or more characteristics of a reading group (e.g., members, administrator, reading content, and one or more breakpoints. In some embodiments, the determination can be based on reading group information 202 received from one or more user devices 104. Continuing with the above example, this can include Jennifer (e.g., a first user 108*a*) submitting via her e-reader device (e.g., a first user device 104*a*) a definition for a reading group that specifies the following: that she, John (e.g., user 108*b*), Marc (e.g., user 108*c*) and Jane (e.g., user 108*d*) are members of a reading group 110; that she is the group administrator 111 for the reading group 110; that the reading group 110 is to read the e-book "The Long Night"; and that there are at least three breakpoints (or stop-read positions 160) at page 100 (e.g., the end of chapter 3 of the e-book "The Long Night"), at page 180 (e.g., the end of chapter 6 of the e-book "The Long Night"), at page 300 (e.g., the end of chapter 9 of the e-book "The Long Night"). The content server 102 may modify (e.g., update) a reading group profile 144 to include or otherwise reflect some or all of the reading group information 202.

In some embodiments, determining reading content for the reading group (block 304) can include the content server 102 determining e-book content (block 204). For example, the content server 102 may identify the e-book content 140 stored in data store 130 that corresponds to the e-book "The Long Night" associated with the reading group 110.

In some embodiments, determining one or more stop-read positions for the reading group (block 306) can include the content server 102 determining at least a first stop-read position based on the breakpoints (or stop-read positions 160) indicated in the reading group information 202 and/or the reading group profile 144. Continuing with the above example, the content server 102 may identify stop-read positions 160 of pages 100, 180 and 300 (e.g., corresponding to the end of chapters 3, 6 and 9) of the e-book "The Long Night" based on the reading group information 202 received from Jennifer and/or the corresponding reading group profile 144 that includes the breakpoints (or stop-read positions 160). In some embodiments, this can include, the content server 102 identifying one or more stop read positions 160 and a corresponding schedule for releasing the stop read position(s). For example, if the group has identified breakpoints at the end of chapters 3, 6, 9, and so forth in the e-book "The Long Night," and corresponding release times of 12:00 a.m. on Jan. 1, 2015; 12:00 a.m. on Jan. 7, 2015, 12:00 a.m. on Jan. 14, 2015, and so forth, then the content server 102 may determine a schedule that includes updating the current stop-read position 160 for the group 110 to be the end of chapter 3 at about 12:00 a.m. on Jan. 1, 2015, updating the current stop-read position 160 for the group 110 to be the end of chapter 6 at about 12:00 a.m. on Jan. 7, 2015, updating the current stop-read position 160 for the group 110 to be the end of chapter 9 at about 12:00 a.m. on Jan. 14, 2015, and so forth.

In some embodiments, sending reading content to the reading group (block 308) and sending one or more stop-read positions to the reading group (block 310) can include the content server 102 sending the determined e-book content 140 and a first stop-read position 160 to some or all of the user devices 104 associated with the members of the reading group 110. Continuing with the above example, the content server 102 may send all of the e-book content 140 (e.g., pages 1-1000) of the e-book "The Long Night" and the first stop-read position 160 (e.g., "100: The_Long_Night") to each of the respective e-reader devices (e.g., user devices 104*a*, 104*b*, 104*c* and 104*d*) associated with Jennifer, John, Marc and Jane (e.g., users 108*a*, 108*b*, 108*c* and 108*d*). In some embodiments, the content server 102 may only send a portion of the e-book content 140, such as the portion of the reading content pertaining to the current reading section (e.g., the portion preceding the current stop-read position 160). For example, the content server 102 may send pages 1-100 of the e-book content 140 of the e-book "The Long Night" (e.g., corresponding to the current reading section preceding the current stop-read position 160) to each of the respective e-reader devices (e.g., user devices 104a, 104b, 104c and 104d) associated with Jennifer, John, Marc and Jane (e.g., users 108a, 108b, 108c and 108d). In such an embodiment, the content server 102 may send corresponding sections of the e-book content 140 along with updated stop-read positions 160 (e.g., send pages 101-180 of the e-book "The Long Night" along with a second stop-read position 160b indicating page 180 of the e-book "The Long Night," and so forth).

In some embodiments, sending one or more stop-read position to the reading group (block 310) can include the content server 102 sending multiple stop-read positions 160 to some or all of the user devices 104 associated with the members of the reading group 110. Continuing with the above example, the content server 102 may send all of the e-book content 140 (e.g., pages 1-1000) of the e-book "The Long Night" and a stop-read position schedule to each of the respective e-reader devices associated with Jennifer, John, Marc and Jane. The stop-read position schedule may include stop-read positions 160 corresponding to the end of chapters 3, 6, 9, and so forth in the e-book "The Long Night," and corresponding release times of 12:00 a.m. on Jan. 1, 2015; 12:00 a.m. on Jan. 7, 2015, 12:00a.m. on Jan. 14, 2015, and so forth. Such a schedule may enable a user device 104 to provide for progressively releasing of content autonomously (e.g., without relying on communications with the content server 102 and/or other user devices 104 to determine when to release sections of e-book content 140). For example, the first user device 104a can execute the stop-read position schedule to release the e-book content 140 up to the end of chapter 3 at about 12:00 a.m. on Jan. 1, 2015, to release the e-book content 140 up to the end of chapter 6 at about 12:00 a.m. on Jan. 7, 2015, to release the e-book content 140 up to the end of chapter 9 at about 12:00 a.m. on Jan. 14, 2015, and so forth. Thus, the user device 104a can progressively release the e-book content 140 for viewing by a user 108 without having to rely on repeated updates from the content server 102 regarding a current stop-read position 160.

As described herein, one or more of the user devices 104 may enable access to the first portion of the reading content preceding the current stop-read position 160. For example, each of the respective e-reader devices (e.g., user devices 104a, 104b, 104c and 104d) may allow Jennifer, John, Marc and Jane (e.g., users 108a, 108b, 108c and 108d) to read pages 1-100 of the e-book "The Long Night" in response to receiving the first stop-read position 160a (e.g., "100: The_Long_Night"). Enabling access to the reading content is described herein with regard to at least method 500 of FIG. 5.

FIG. 4 is a flow diagram that illustrates an example method for updating stop-read positions 160 for reading groups 110 in accordance with one or more embodiments. Method 400 may generally include receiving reading positions for members of a reading group (402), determining occurrence of triggering event to update stop-read position (block 404), determining a next stop-read position for the reading content (block 406), and sending the next stop-read position to the reading group (block 408). In some embodiments, some or all of the aspects of method 400 can be performed by the content server 102 (e.g., some or all of the aspects of method 400 can be performed by the e-book management module 120).

In some embodiments, receiving reading positions for members of a reading group (402) can include the content server 102 receiving reading information including reading positions 150 for the members of the reading group 110. Continuing with the above example, if John engages in a reading session one afternoon in which he reads to page 60 (e.g., in the middle of chapter 2), then John's e-reader may determine that John's last page read was page 60 and may send an indication of page 60 of the e-book "The Long Night" to the content server 102. If the end of chapter 3 is at page 100 and the breakpoint is at the end of chapter 3 (e.g., the stop-read position 160 is page 100), then the content server 102 can determine that John has completed about 60% of the current reading section for the reading group 110. The content server 102 may update a user profile 142 for John and/or the reading group profile 144 to include a last page read of page 60 of the e-book "The Long Night" for John and/or a reading completion of 60% for chapters 1-3 of the e-book "The Long Night" for John. If John engages in a second reading session the next afternoon in which he reads to page 100, then John's e-reader may determine that John's last page read was page 100 and may send an indication of page 100 of the e-book "The Long Night" to the content server 102. The content server 102 can determine that John has completed all (e.g., 100%) of the current reading section for the reading group 110. The content server 102 may update a user profile 142 for John and/or the reading group profile 144 to include a last page read of page 100 of the e-book "The Long Night" for John and/or a reading completion of 100% for chapters 1-3 of the e-book "The Long Night" for John. A similar process can be completed for each of the members of the reading group 110 such that the content server 102 can track each member's reading progress. In some embodiments, the content server 102 may update the reading group profile 144 and/or the historical reading data 146 to include or otherwise reflect the received reading information 212.

In some embodiments, determining occurrence of triggering event to update stop-read position (block 404) can include the content server 102 determining the following: the reading group 110 has read a threshold amount of the reading content, a time schedule for releasing content has occurred, a corresponding episode of a television series has just aired, and/or the like. For example, determining occurrence of triggering event to update stop-read position can include the content server 102 determining that at least a threshold amount of the current reading section (e.g., the portion of the reading content preceding the current stop-read position 160) has been read by the reading group 110. In some embodiments, the threshold amount can be all (e.g., 100%) of the current reading section. Continuing with the above example, the content server 102 may determine that the reading group 110 has read a threshold amount of reading section in response to determining that Jennifer, John, Marc and Jane (e.g., users 108a, 108b, 108c and 108d) have each read all of chapters 1-3 (e.g., each of the members of the reading group 110 has a user profile 142 indicating a last page read of page 100 for the e-book "The Long Night"). In some embodiments, the threshold amount can be less than all (e.g., 90%) of the current reading section. For example, the content server 102 may determine that the reading group 110 has read a threshold amount of reading section in response to determining that that Jennifer, John, Marc and Jane (e.g., users 108a, 108b, 108c and 108d) have each read at least 90% of chapters 1-3 (e.g., each of the members of the reading group 110 has a user profile 142 indicating a last page read of at least page 90 for the e-book "The Long Night"). In some embodiments, determining that the reading group 110 has read a threshold amount of reading content can include determining that at least a threshold amount (e.g., number or percentage) of the members of the reading group 110 have read at least a threshold amount of the current reading section for the reading group 110. For example, if it is required that at least 75% of the members of a reading group 110 have read 90% of the current reading section before releasing a next reading section to the reading group 110, then content server 102 may determine that the reading group 110 has read the threshold amount of reading content in response to determining that at least 3 of the 4 members of the reading group 110 have read to at least page 90 of the e-book "The Long Night."

In some embodiments, determining a next stop-read position for the reading content (block 406) can include the content server 102 determining a next stop-read position 160 in the reading content that is beyond the current stop-read position 160 for the reading group 110. For example, if the reading group 110 has identified breakpoints at pages 100, 180, 300 and so forth of the e-book "The Long Night" (e.g., corresponding to the ends of chapters 3, 6, 9, and so forth, respectively of the e-book "The Long Night"), and the current stop-read position 160 is page 100, then in response to determining that the four member have each read at least a threshold amount of chapters 1-3, the content server 102 may determine a next (or updated) stop-read position 160 of page 180 of the e-book "The Long Night" (e.g., corresponding to the end of chapter 6 of the e-book "The Long Night"). Thus, determining a next (or updated) stop-read position 160 can include identifying a predetermined stop-read position 160.

In some embodiments, sending the next stop-read position to the reading group (block 408) can include the content server 102 sending a next stop-read position 160 to some or all of the user devices 104 associated with the members of the reading group 110. For example, the content server 102 may send the stop-read position 160 of page 180 of the e-book "The Long Night" (e.g., "180: The_Long_Night") to each of the respective e-reader devices (e.g., user devices 104a, 104b, 104c and 104d) associated with Jennifer, John, Marc and Jane (e.g., users 108a, 108b, 108c and 108d).

As described herein, one or more of the user devices 104 may enable access to the first portion of the reading content preceding the current stop-read position 160. For example, each of the respective e-reader devices (e.g., user devices 104a, 104b, 104c and 104d) may allow Jennifer, John, Marc and Jane (e.g., users 108a, 108b, 108c and 108d) to read pages 1-180 of the e-book "The Long Night" in response to receiving the second stop-read position 160 (e.g., "180: The_Long_Night"). Enabling access to the reading content is described herein with regard to at least method 500 of FIG. 5.

Figure 5:
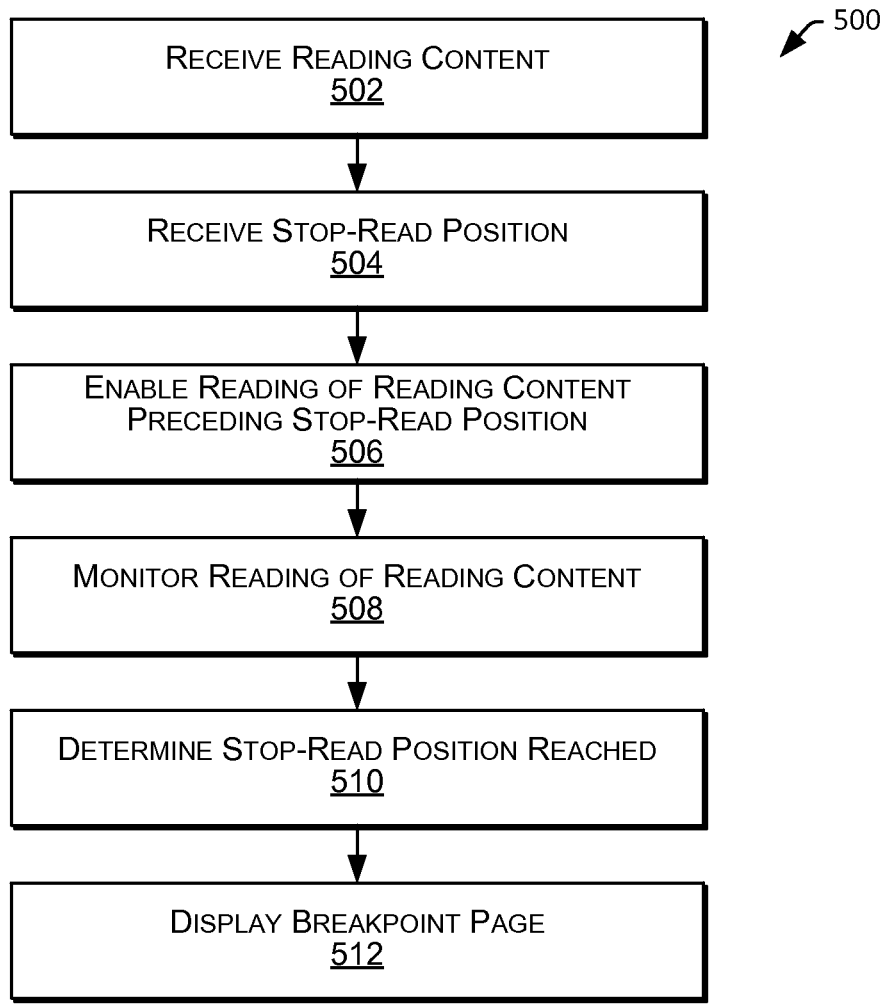
FIG. 5 is a flow diagram that illustrates an example method for presenting reading content in accordance with one or more embodiments.

FIG. 5 is a flow diagram that illustrates an example method 500 for providing reading content to a reading group in accordance with one or more embodiments. Method 500 may generally include receiving reading content (block 502), receiving a stop-read position (block 504), enabling reading of reading content preceding the stop-read position (block 506), monitoring reading of the reading content (block 508), determining stop-read position reached (block 510), displaying a stop-read page (block 512). In some embodiments, some or all of the aspects of method 500 can be performed by a user device 104 (e.g., some or all of the aspects of method 500 can be performed by an e-reader application 112 of the user device 104).

In some embodiments, receiving reading content (block 502) can include a user device 104 receiving reading content and/or receiving a stop-read position (block 504) from the content server 102. In some embodiments, receiving reading content can include receiving all of the e-book content 140. For example, John's e-reader (e.g. user device 104b) may receive all of the e-book content 140 (e.g., pages 1-1000) of the e-book "The Long Night" from the content server 102. In some embodiments, receiving reading content can include receiving only a portion of the e-book content 140, such as the portion of the reading content pertaining to the current reading section (e.g., the portion preceding a current stop-read position 160). For example, John's e-reader (e.g. user device 104b) may receive pages 1-100 of the e-book content 140 of the e-book "The Long Night" (e.g., corresponding to the current reading section preceding the current stop-read position 160) and the first stop-read position 160 of page 100 of the e-book "The Long Night" (e.g., "100: The_Long_Night") from the content server 102. In such an embodiment, the user device 104 may receive corresponding sections of the e-book content 140 along with updated stop-read positions 160. For example, John's e-reader (e.g. user device 104b) may receive pages 101-180 of the e-book "The Long Night" along with a second stop-read position 160 indicating page 180 of the e-book "The Long Night," and so forth.

In some embodiments, receiving a stop-read position (block 504) can include the user device 104 receiving a stop-read position 160 from the content server 102. Continuing with the above example, the content server 102 may send (and the user device 104b may receive) a first stop-read position 160 (e.g., "100: The_Long_Night"), a second stop-read position 160 (e.g., "180: The_Long_Night"), and/or the like.

In some embodiments, enabling reading of reading content preceding the stop-read position (block 506) can include the user device 104 enabling access to the portion of the reading content preceding the first stop-read position 160. Continuing with the above example, in response to John's e-reader (e.g. user device 104b) receiving the first stop-read position 160 of page 100 of the e-book "The Long Night" (e.g., "100: The_Long_Night"), the e-reader device may allow John to read pages 1-100 of the e-book "The Long Night" (and inhibit John from reading beyond page 100). Similarly, in response to John's e-reader (e.g. user device 104b) receiving the second stop-read position 160 of page 180 of the e-book "The Long Night" (e.g., "180: The_Long_Night"), the e-reader device may allow John to read pages 1-180 of the e-book "The Long Night" (and inhibit John from reading beyond page 180).

In some embodiments, monitoring reading of the reading content (block 508) can include the user device 104 monitoring the pages read by the corresponding user 108. In some embodiments, this can include tracking a current reading position 150 (e.g., last page read) for the user 108 and sending corresponding reading information 212 to the content server 102. Continuing with the above example, if John engages in a reading session one afternoon in which he reads to page 60 (e.g., in the middle of chapter 2), then John's e-reader (e.g. user device 104b) may determine that John's last page read was page 60 and may send an indication of page 60 of the e-book "The Long Night" to the content server 102. Similarly, if John engages in a second reading session the next afternoon in which he reads to page 100, then John's e-reader (e.g. user device 104b) may determine that John's last page read was page 100 and may send an indication of page 100 of the e-book "The Long Night" to the content server 102.

In some embodiments, determining stop-read position reached (block 510) can include the user device 104 determining that the last page read for the corresponding user 108 is equal to or greater than a stop-read position. Continuing with the above example, if John engages in a reading session one afternoon in which he reads to page 100, then John's e-reader (e.g. user device 104*b*) may determine that John's last page read was page 100 and determine that the last page read is equal to or greater than the first stop-read position of page 100 of the e-book "The Long Night" (e.g., "100: The_Long_Night"). Such a determination can be made for each stop-read position regardless of whether it is the current stop-read position 160. For example, if John's last reading position 150 is page 95 when the e-reader receives the second stop-read position of page 180 of the e-book "The Long Night" (e.g., "180: The_Long_Night"), and John later reads to page 100 of the e-book "The Long Night," then John's e-reader (e.g. user device 104*b*) may determine that John has reached a stop-read position 160. This can provide, for example, display of a breakpoint page (as described below) at each breakpoint regardless of the current stop-read position 160.

In some embodiments, displaying a breakpoint page (block 512) can include the user device 104 displaying a breakpoint page in response to determining that a user 108 has reached a stop-read position. For example, in response to determining that John's last page read is equal to or greater than the first stop-read position of page 100 of the e-book "The Long Night" (e.g., "100: The_Long_Night"), John's e-reader (e.g. user device 104*b*) may display a breakpoint page corresponding to page 100 of the e-book "The Long Night." In some embodiments, a breakpoint page can include a variety of information and/or interactive elements.

Figure 6:
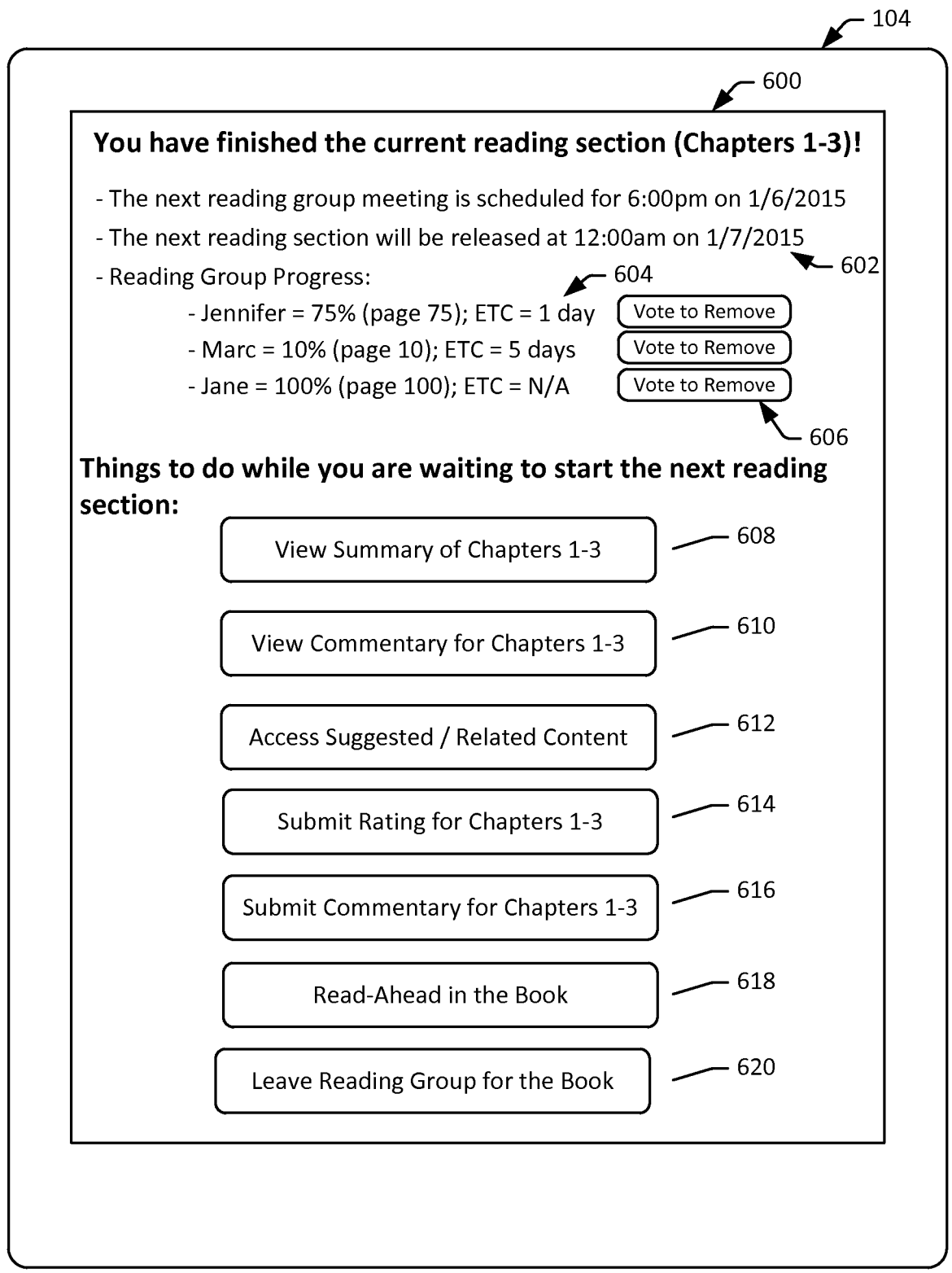
FIG. 6 is an illustration of an example breakpoint page in accordance with one or more embodiments.

FIG. 6 displays an example breakpoint page 600 in accordance with one or more embodiments. In some embodiments, a breakpoint page 600 can include a release time 602 indicating a time (or at least an estimate of a time) when the next reading section will be released (or "unlocked"). For example, if the breakpoint (or stop-read position 160) for the reading group 110 is scheduled (or estimated) to be updated to the end of chapter 6 of the e-book "The Long Night" at 12:00 a.m. on Jan. 7, 2015 (e.g., based on a scheduled update of stop-read positions 160), then the breakpoint page 600 may display a release time 602 corresponding thereto. In some embodiments, the breakpoint page 600 may display a countdown to the time (e.g., "Only 22 hours and 5 minutes until you can begin reading chapters 4-6").

In some embodiments, a breakpoint page 600 can include a reading group progress 604 that indicates the reading progress of other members of a reading group 110. For example, a breakpoint page 600 displayed by John's e-reader (e.g. user device 104*b*) at the end of chapter 3 of the e-book "The Long Night" may include a reading group progress 604 that indicates the reading progress of Jennifer, Marc, and Jane. In some embodiments, the reading progress 604 can include an estimated time for the members to complete ("ETC") reading the current reading section (e.g., based on the member's reading speed, reading patterns, and/or the like).

In some embodiments, a breakpoint page 600 can include an interactive element for voting to remove one or more users from a reading group 110. For example, a breakpoint page 600 displayed by John's e-reader (e.g. user device 104*b*) at the end of chapter 3 of the e-book "The Long Night" may include three user selectable buttons 606 for voting respective members out of the group. If, for example, a threshold amount of the reading group 110 (e.g., more than 60% of the members of the reading group 110) vote to remove a member from the group, then the member may be removed from the reading group 110.

In some embodiments, a breakpoint page 600 can include supplemental content and/or links thereto. For example, a breakpoint page 600 displayed at the end of chapter 3 of the e-book "The Long Night" may include a link to a summary of chapters 1-3 (e.g., button 608), a link to commentary for chapters 1-3 (e.g., button 610), a link to access suggested and/or related content for chapters 1-3 (e.g., button 612), and/or the like. Upon selection of the button 608, a page including a summary of chapters 1-3 of the e-book "The Long Night" may be displayed. Upon selection of the button 610, a page including commentary (e.g., by other members of the reading group 110) for chapters 1-3 of the e-book "The Long Night" may be displayed. Upon selection of the button 612, a page including other content (or links to other content) related to chapters 1-3, such as other formats of the reading section (e.g., video, such as scenes of a movie or television show, that corresponds to chapters 1-3), other e-books, articles about the e-book, related products, and/or the like may be displayed.

In some embodiments, a breakpoint page 600 can include an interactive element for rating a reading section. For example, the breakpoint page 600 at the end of chapter 3 of the e-book "The Long Night" may include a "Submit Rating for Chapter 1-3" (e.g., button 614). Upon selection of the button 614, a page for submitting a rating for chapters 1-3 of the e-book "The Long Night" may be displayed.

In some embodiments, a breakpoint page 600 can include an interactive element for submitting commentary for a reading section. For example, the breakpoint page 600 at the end of chapter 3 of the e-book "The Long Night" may include a "Submit Commentary for Chapter 1-3" (e.g., button 616). Upon selection of the button 616, a page for submitting commentary for chapters 1-3 of the e-book "The Long Night" may be displayed.

In some embodiments, a breakpoint page can include an interactive element for requesting to read ahead of the reading group 110. For example, the breakpoint page 600 at the end of chapter 3 of the e-book "The Long Night" may include a "Read Ahead in the Book" (e.g., button 618). Upon selection of the button 618, the member may be provided access to the next reading section (e.g., chapters 1-6) of the e-book "The Long Night" as described herein (e.g., automatically, or after approval by the group administrator 111 for the reading group 110).

In some embodiments, a breakpoint page 600 can include an interactive element for opting out of the reading group 110. For example, the breakpoint page 600 at the end of chapter 3 of the e-book "The Long Night" may include a "Leave Reading Group for the Book" (e.g., button 620). Upon selection of the button 620, the member may be removed from the reading group 110 and may be provided access to the entirety of the e-book "The Long Night" as described herein.

It will be appreciated that the processes and methods described herein are example embodiments of processes and methods that may be employed in accordance with the techniques described herein. The processes and methods may be modified to facilitate variations of their implementation and use. The order of the processes and methods and the operations provided therein may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described herein.

Figure 7:
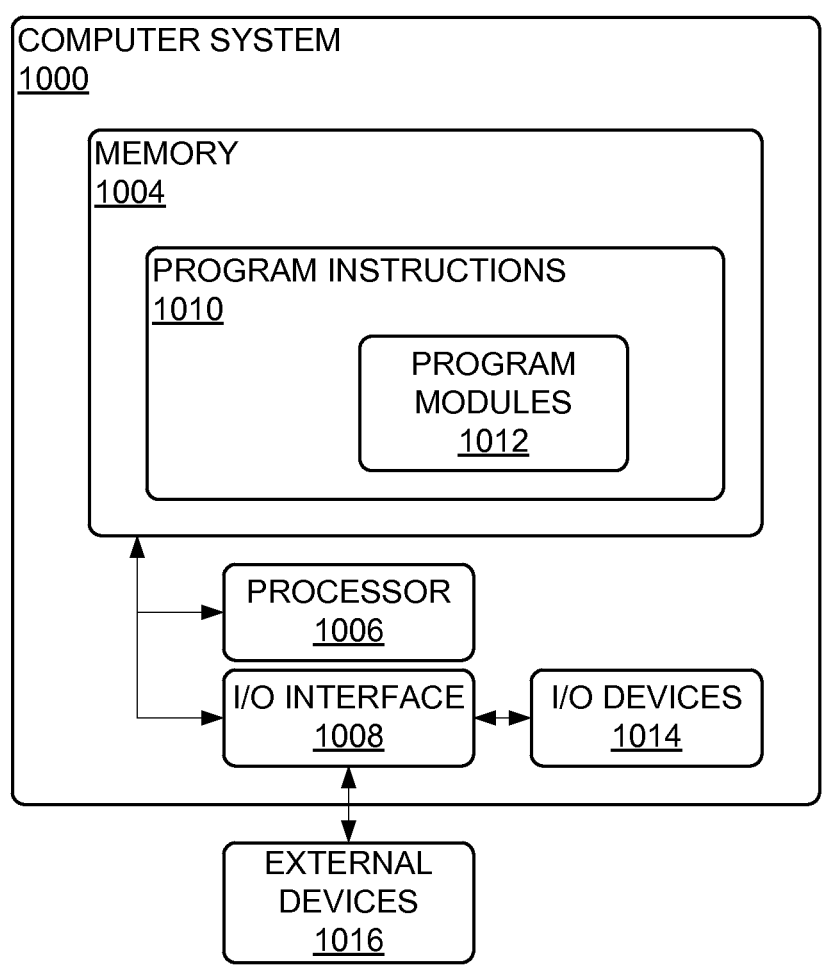
FIG. 7 is a diagram that illustrates an example computer system in accordance with one or more embodiments.

FIG. 7 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including those described with regard to the process 200 and the methods 300, 400 and 500. In the context of a computer system of a user device 104, the program modules 1012 may include user device module (e.g., an e-reader application 112) for performing some or all of the operations described with regard to the user device 104. In the context of the content server 102, the program modules 1012 may include a content server module (e.g., e-book management module 120) for performing some or all of the operations described with regard to the content server 102.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 1006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, transceiver, and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method comprising:
   determining, by one or more computer processors coupled to memory, a reading group associated with content, the reading group comprising a first user profile associated with a first user device, a second user profile associated with a second user device, an indication that the first user profile is designated as a group administrator;
   determining a first stop-position indicative of a first position in the content;
   determining a second stop-position indicative of a second position in the content;
   sending, to the first user device and the second user device, a message comprising at least the first stop-position, and instructions to enable access to a first section, wherein the first section comprises a portion of the content preceding the first stop-position;
   determining a release time associated with the second stop-position; and
   sending the second stop-position to the first user device and the second user device at the release time.

2. The method of claim 1, wherein the first stop-position is determined based on at least one of input from an author of the content, input from a publisher of the content, locations of ends of sections of the content, lengths of sections of the content, or a semantic analysis of the content identifying natural breakpoints of the content.

3. The method of claim 1, further comprising:
determining an occurrence of a triggering event, wherein the triggering event is a release of a media asset corresponding to the content;
generating an updated second stop-position at a third position in the content based at least in part on the triggering event; and
sending the updated second stop-position to the first user device and the second user device.

4. The method of claim 1, further comprising:
determining an occurrence of a triggering event, wherein the triggering event is a presentation of a threshold amount of the first portion of the content by the first user device and by the second user device;
generating an updated second stop-position at a third position in the content based at least in part on the triggering event; and
sending the updated second stop-position to the first user device and the second user device.

5. The method of claim 1, further comprising:
receiving, from the second user device, a request for a second section;
sending the request to the first user device;
receiving an indication of an approval from the group administrator at the first user device; and
sending the second stop-position to the second user device.

6. The method of claim 5, further comprising:
sending a first supplemental content corresponding to the first section to the first user device and the second user device;
determining the second user device has' was sent the second stop-position; and
sending a second supplemental content corresponding to the second section to the second user device.

7. The method of claim 1, wherein determining the reading group comprises:
determining that the first user profile purchased the content;
determining that the second user profile purchased the content;
sending a first invitation to join the reading group to the first user device;
sending a second invitation to join the reading group to the second user profile;
receiving a first acceptance of the first invitation from the first user profile;
receiving a second acceptance of the second invitation from the second user profile; and
generating a reading group profile comprising the first user profile, the second user profile, and an indication of the content.

8. The method of claim 1, further comprising:
receiving a request from the second user device to be removed from the reading group;
removing the second user profile from the reading group; and
sending instructions to the second user device to enable access to the content.

9. A device comprising:
at least one memory that stores computer-executable instructions; and
at least one processor configured to access the at least one memory and execute the computer-executable instructions to:
determine a reading group associated with content, the reading group comprising a first user profile associated with a first user device, a second user profile associated with a second user device, an indication that the first user profile is designated as a group administrator;
determine a first stop-position indicative of a first position in the content;
determine a second stop-position indicative of a second position in the content;
send a first portion of the content to the first user device and the second user device, wherein the first portion of the content corresponds to content preceding the first stop-position;
send a breakpoint page to the first user device and the second user device, wherein the breakpoint page is displayed as a last page of the first portion of the content and includes supplemental content.

10. The device of claim 9, wherein the at least one processor is further configured to access the at least one memory and execute the computer-executable instructions to:
receive a first indication that a threshold amount of the first portion of the content has been displayed on the first user device;
receive a second indication that the threshold amount of the first portion of the content has been displayed on the second user device; and
send a second portion of the content to the first user device and the second user device, the second portion of the content corresponding to content subsequent to the first stop-position and preceding the second stop-position.

11. The device of claim 9, wherein the at least one processor is further configured to access the at least one memory and execute the computer-executable instructions to:
receive a request from the second user device to be removed from the reading group;
remove the second user profile from the reading group; and
send the content to the second user device.

12. The device of claim 9, wherein the at least one processor is further configured to access the at least one memory and execute the computer-executable instructions to:
receive, from the second user device, a request for a second portion of the content;
send the request to the first user device;
receive an indication of an approval from the group administrator at the first user device; and
send the second stop-position to the second user device.

13. The device of claim 9, wherein the at least one processor is further configured to access the at least one memory and execute the computer-executable instructions to:
determine a release time associated with the second stop-position; and
send a second portion of the content to the first user device and the second user device at the release time, the second portion of the content corresponding to content subsequent to the first stop-position and preceding the second stop-position.

14. The device of claim 9, wherein the supplemental content comprises at least one of a summary of the first portion of the content, commentary of the first portion of the content by one or more members of the group, commentary of the first portion of the content by one or more non-group member users, or suggested content related to the content.

15. A method comprising:

determining, by one or more computer processors coupled to memory, a reading group associated with content, the reading group comprising a first user profile associated with a first user device, a second user profile associated with a second user device, and an indication that the first user profile is designated as a group administrator;

determining a first stop-position indicative of a first position in the content based on at least one of input from an author of the content, input from a publisher of the content, locations of ends of sections of the content, lengths of sections of the content, or a semantic analysis of the content identifying natural breakpoints of the content;

determining a second stop-position indicative of a second position in the content; and sending a message comprising at least the first stop-position and instructions to enable access to a first section, wherein the first section comprises a portion of the content preceding the first stop-position;

determining a release time associated with the second stop-position; and sending the second stop-position to the first user device and the second user device at the release time.

16. The method of claim 15, further comprising:

determining an occurrence of a triggering event;

generating an updated second stop-position at a third position in the content based at least in part on the triggering event; and sending the updated second stop-position to the first user device and the second user device.

17. The method of claim 15, further comprising:

determining an occurrence of a triggering event, wherein the triggering event is a presentation of a threshold amount of the first portion of the content by the first user device and by the second user device;

generating an updated second stop-position at a third position in the content based at least in part on the triggering event; and sending the updated second stop-position to the first user device and the second user device.

* * * * *